Oct. 27, 1931.  P. F. JACKSON  1,829,448
TUBE TESTING DEVICE
Filed Dec. 15, 1930
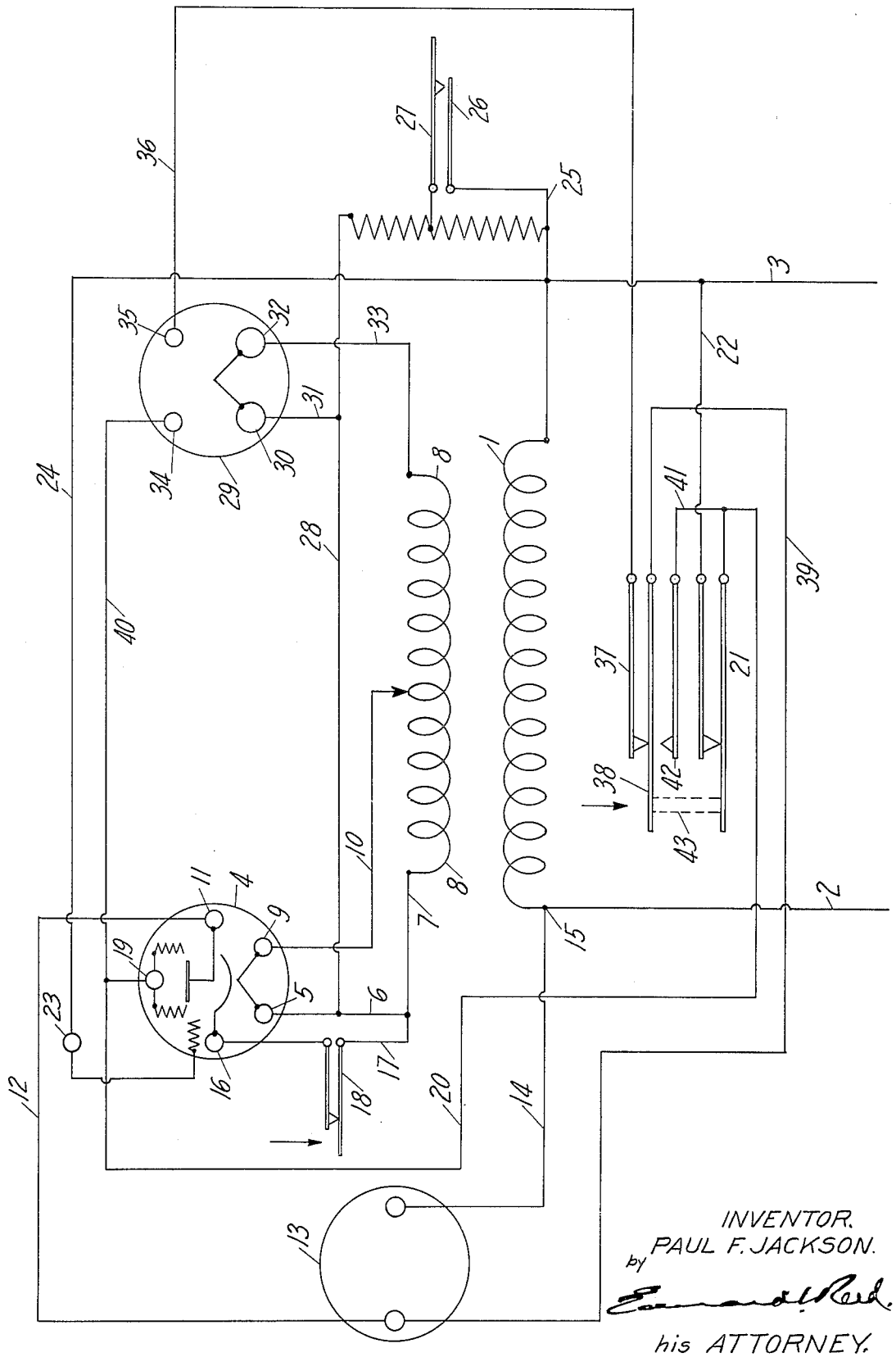
INVENTOR.
PAUL F. JACKSON.
by
his ATTORNEY.

Patented Oct. 27, 1931

1,829,448

UNITED STATES PATENT OFFICE

PAUL F. JACKSON, OF DAYTON, OHIO, ASSIGNOR TO THE RADIO PRODUCTS COMPANY, OF DAYTON, OHIO, A CORPORATION OF OHIO

TUBE TESTING DEVICE

Application filed December 15, 1930. Serial No. 502,371.

This invention relates to a device for testing audion tubes such as are commonly used in radio receiving sets. There are various types of audion tubes each differing from the other in the character of its internal elements, common among which are the screen grid tube, the cathode or indirect heater tube and the two plate tube. Each of these requires a device having different characteristics for testing the same.

One object of the invention is to provide a single device on which any one of a plurality of tubes may be tested and which will be simple in its construction and operation.

A further object of the invention is to provide improved means for testing a tube of any one of the above mentioned types, which means may be used alone or may be combined with a device or devices for testing other types of tubes.

Other objects of the invention will appear as the device is described in detail.

The accompanying drawing is a diagrammatic illustration of a device embodying my invention. In this drawing I have illustrated one embodiment of the invention and have shown the same as comprising two tube sockets but it will be understood that this embodiment has been chosen for the purpose of illustration only and that the device may take various forms and may embody any desired number of tube sockets.

As here illustrated the device comprises a transformer the primary 1 of which is connected with conductors 2 and 3 of a line circuit which leads to a suitable source of alternating current and preferably is adapted to be plugged into a light socket, or other current outlet of an ordinary light circuit. A tube socket 4 has a filament terminal 5 connected through conductors 6 and 7 with the secondary 8 of the transformer and has a second filament terminal 9 connected through a conductor 10 with said secondary, in spaced relation to the point of connection of the filament terminal 5 therewith. A plate terminal 11 is connected by a conductor 12 with a meter 13, such as an ordinary milliammeter, and this meter is connected by a conductor 14 with the conductor 2 of the line circuit, preferably at one end of the primary, as shown at 15. This meter serves to indicate the value of the plate current. This socket is adapted to receive a tube of the cathode or indirect heater type in which the filament or heating element is surrounded by a tubular member or cathode which, when heated by the filament, will produce an electronic emission to the plate. The cathode is not connected with the filament and should there be any leakage from the filament to the cathode the tube will not function properly but will be classed as an imperfect tube. The socket 4 has a cathode terminal 16 which is connected by a conductor 17 with the conductor 7 leading to the secondary. In order to test the tube and determine whether or not there is any leakage between the filament and the cathode a normally closed switch 18 is interposed in the circuit 17. When this switch is opened and the cathode circuit broken there should be no emission from the cathode to the plate and if the meter shows current in the plate circuit this indicates that there is a leakage between the filament and the cathode elements of the tube.

The socket 4 is also provided with a grid terminal 19 for the usual or control grid of a three element tube but which also serves as a terminal for the screen grid of a screen grid tube. This grid terminal 19 is connected by a conductor 20 with a normally closed switch 21 which in turn is connected by a conductor 22 with the conductor 3 of the line circuit. A terminal 23 is provided for the usual or control grid of a screen grid tube and this terminal is connected by conductors 24 and 25 with one member 26 of a normally open grid shifting switch, this member 26 being also connected with the primary. The other member 27 of the grid shifting switch is connected by a conductor 28 with a filament circuit 6, which is connected with the secondary. The device also embodies a second tube socket 29 having a filament terminal 30 connected by a conductor 31 with a conductor 28 which leads to the secondary. The second filament terminal 32 is connected by a conductor 33 with the opposite end of the secondary. This tube has two terminals, 34 and 35, which serve respectively, as grid and plate terminals in testing a three element tube and also serve as separate plate terminals for a tube of the two plate type. The plate terminal 35 is connected by a conductor 36 with a stationary switch member 37 which is normally in engagement with a movable switch member 38 connected by a conductor 39 with the meter 13. The plate terminal 34 is connected by a conductor 40 with the screen grid circuit 20 and this screen grid circuit is connected at a point in advance of the switch 21, that is, between the switch and the screen grid, with a conductor 41 leading to a switch member 42 also cooperating with the movable switch member 38 and normally out of engagement therewith. The movable switch member 38 is so connected with the movable member of the switch 21 that the switch 21 will be opened when the movable member 38 is moved into engagement with the switch member 42, this being here accomplished by an insulated connecting rod 43.

When a three element tube is being tested the grid circuit is closed through the terminal 19, conductor 20, normally closed switch 21 and conductors 22 and 25 to the switch member 26 of the grid shifting switch. Thus by closing the grid shifting switch 26—27 the electrical position of the grid with respect to the filament is changed, with a corresponding change in the plate current, this change in the plate current being an indication of the worth of the tube. For the test of a screen grid tube the terminal 19 serves as the screen grid or high potential terminal and a separate terminal 23 is provided for the usual or control grid. The movable switch member 38 is actuated to open the switch 21 and disconnect the screen grid terminal from the control grid shifting switch 26—27. The engagement of the movable switch member 38 with the switch member 42 connects the screen grid with the plate circuit and thus causes a potential equal to the plate potential to be impressed upon the screen grid. While the switch member 38 is retained in this position the control grid shifting switch 26—27 is closed and the tube tested in the usual manner.

A separate two plate tube test is desirable and this apparatus provides means for making such a test without the use of additional switches. With the switch members in the positions shown the plate terminal 35 will be connected through conductor 36, switch members 37 and 38, conductor 39, meter 13 and conductor 14, to the primary, thus enabling the meter to indicate the value of the current of plate 35. When the movable switch member 34 is moved out of engagement with the switch member 37 and into engagement with the switch member 42 the plate terminal 35 is disconnected from the meter and the plate terminal 34 is connected therewith through the conductors 40, 20 and 41, switch members 42 and 38 and conductor 39, thus enabling the meter to indicate the value of the current of plate 34. In this manner there is provided a separate plate current indication for each plate terminal so that unbalanced conditions of the plate current may be readily observed.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a device for testing a tube having a filament, a cathode and a plate, a transformer having means for connecting the primary thereof with a source of current, a circuit connecting said filament with the secondary of said transformer, a circuit connecting said plate with said source of current, a meter in the plate circuit, a connection between said cathode and said secondary, and means for interrupting the connection between said cathode and said secondary to cause said meter to indicate any leakage between the filament and the cathode.

2. In a tube testing device, a transformer having means for connecting the primary thereof with a source of current, a tube socket having filament terminals connected with the secondary of said transformer, having a cathode terminal connected with said secondary and having a plate terminal connected with said source of current, a meter in the plate circuit, and a normally closed manually operated switch in the cathode circuit, whereby when said switch is opened the meter will indicate any leakage between the filament and the cathode.

3. In a tube testing device, a transformer having means for connecting the primary thereof with a source of current, a tube socket having filament terminals connected with the secondary of said transformer, a plate terminal connected with said source of current, a screen grid terminal connected with said source of current, a meter in the plate circuit, a control grid terminal connected with said secondary, a grid shifting switch in the control grid circuit, one member of which is connected with the screen grid circuit and with said source of current, and means for disconnecting said screen grid circuit from said control grid switch and connecting the same with said plate circuit.

4. In a tube testing device, a transformer having means for connecting the primary thereof with a source of current, a tube socket having filament terminals connected with the secondary of said transformer, a plate terminal connected with said source of current, a screen grid terminal connected with said source of current, a normally closed switch in the screen grid circuit, a meter in the plate circuit, a control grid terminal connected with said secondary, a grid shifting switch in the control grid circuit, one member of which is connected with the screen grid circuit and said source of current, and a third switch one member of which is connected with the screen grid circuit in advance of the first mentioned switch and the other member of which is connected with said plate circuit.

5. In a tube testing device, a transformer having means for connecting the primary thereof with a source of current, a tube socket having filament terminals connected with the secondary of said transformer, a plate terminal connected with said source of current, a screen grid terminal connected with said source of current, a normally closed switch in the screen grid circuit, a meter in the plate circuit, a control grid terminal connected with said secondary, a grid shifting switch in the control grid circuit, one member of which is connected with the screen grid circuit and said source of current, and a third switch one member of which is connected with the screen grid circuit in advance of the first mentioned switch and the other member of which is connected with said plate circuit, and means for actuating the first mentioned switch and said third switch in unison to disconnect the screen grid circuit from said grid shifting switch and connect the same with said plate circuit.

6. In a tube testing device, a transformer having means for connecting the primary thereof with a source of current, a tube socket having filament terminals connected with the secondary of said transformer, a plate terminal connected with said source of current, a cathode terminal connected with said secondary, and a screen grid terminal connected with said source of current, a meter in the plate circuit, a normally closed switch in the cathode circuit, a control grid terminal connected with said secondary, a grid shifting switch in the control grid circuit, one member of which is connected with the screen grid circuit and with said source of current, and means for disconnecting said screen grid circuit from said control grid switch and connecting the same with said plate circuit.

7. In a tube testing device, a transformer having means for connecting the primary thereof with a source of current, a tube socket having filament terminals connected with the secondary of said transformer, a plate terminal connected with a source of current, and a screen grid terminal connected with a source of current, a normally closed switch in the screen grid circuit, a meter in the plate circuit, a second tube socket having filament terminals connected with said secondary and having two plate terminals one of which is connected with the screen grid circuit of the first mentioned socket, a switch member connected with said screen grid circuit between the screen grid and the switch in that circuit, a second switch member connected with the other plate terminal of said second socket, a movable switch member connected with said meter and with the plate circuit of the first mentioned socket and cooperating with the first mentioned switch members to alternately connect the plate terminals of said second socket with said meter, a control grid terminal, a switch in the control grid circuit, one member of which is connected with said source of current and with said screen grid circuit, and means actuated by the movement of said movable switch member into engagement with that switch member which is connected with said screen grid circuit to open the switch in said screen grid circuit.

In testimony whereof, I affix my signature hereto.

PAUL F. JACKSON.